United States Patent [19]

Taylor

[11] 4,066,884
[45] Jan. 3, 1978

[54] MULTIPLE LIGHT INTENSITY FLASH UNIT

[75] Inventor: Robert L. Taylor, Imlaystown, N.J.

[73] Assignee: International Telephone and Telegraph Corporation, Nutley, N.J.

[21] Appl. No.: 721,660

[22] Filed: Sept. 8, 1976

[51] Int. Cl.² .............................................. G03B 15/02
[52] U.S. Cl. .................................... 362/16; 354/126; 362/277
[58] Field of Search ............... 354/126, 139, 145, 149; 240/1.3, 46.03, 46.45, 46.59; 350/315, 318

[56] References Cited

U.S. PATENT DOCUMENTS 3,843,878  10/1974  Ueda et al. ........................... 240/1.3

*Primary Examiner*—John Gonzales
*Attorney, Agent, or Firm*—John T. O'Halloran; Peter C. Van Der Sluys

[57] ABSTRACT

A multiple light intensity electronic flash unit for self-developing camera uses a slidably mounted neutral density filter to vary the effective light intensity of the flash. The flash unit enables the camera to be operable when subjects are close to the camera without overexposing the film.

7 Claims, 5 Drawing Figures

MULTIPLE LIGHT INTENSITY FLASH UNIT

BACKGROUND OF THE INVENTION

Self-developing cameras are currently available for providing instant color photographs with no need for external film processing. The self-developing cameras currently available utilize explosive flash bulbs to illuminate the subject in low ambient light level conditions. These cameras generally contain electronic means to sense the flash intensity and to govern the film exposure time by operably and automatically closing the camera shutter when the film is exposed to a predetermined quantity of light.

When electronic flash units are employed with the aforementioned cameras the automatic light intensity control mechanism becomes inoperative since the flash duration of an electronic flash lamp is too rapid to permit the camera light sensing mechanism to respond. By the time the camera electronic eye senses sufficient light intensity to control the camera shutter mechanism the flash unit has already fired.

The purpose of this invention is to provide means for controlling the amount of light intensity that reaches the film during camera operation when an electronic flash unit is employed.

SUMMARY OF THE INVENTION

An electronic flash unit employs a slidably mounted neutral density filter to control the amount of illumination during film exposure. When the subject is at a sufficient distance from the camera so that the reflected light can expose the film without overexposure the filter is not employed. When the subject is within a predetermined distance from the camera so that reflected light would overexpose the film the filter is moved intermediate the flash lamp and the subject to substantially reduce the amount of projected light.

DESCRIPTION OF THE PREFERRED EMBODIMEMT

Figure 1:
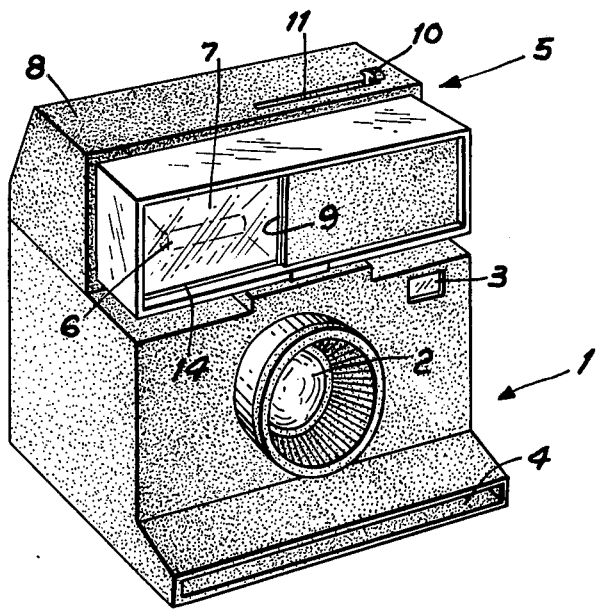
FIG. 1 is a perspective view of the flash unit of this invention mounted on a camera.

FIG. 1 shows a self-developing type camera 1 such as the Kodak EK4 and EK6 models, for example, containing a chute 4 for release of the exposed film for further development in air. Camera 1 also includes a lens 2 and a viewfinder 3. The lens 2 is of the fixed aperture type so that the amount of light entering is governed by the duration that the camera shutter remains open. In order to control the amount of light entering the lens 2 the camera 1 contains a photoelectric sensing element which governs the camera shutter exposure time. When the light illumination level is quite high the electronic control mechanism permits the shutter to remain open for a shorter duration of time than when the level of light illumination is quite low. The electronic shutter control mechanism usually requires a finite amount of time to sense the light illumination level and to electronically control the shutter operating mechanism. When explosive type flash units are used with camera 1 the flash duration of the explosive flash bulb is long enough to permit the electronic shutter control mechanism to respond accordingly.

When electronic type flash units employing a xenon type arc tube having a flash duration substantially shorter than with explosive flash bulbs the camera's electronic sensing mechanism becomes nonfunctional. The electronic flash output is too short to allow the camera electronic sensing mechanism to control the required shutter opening increment so that the shutter tends to remain open longer than is necessary to fully expose the film. When electronic flash units are used with cameras of the type shown in FIG. 1 some alternate means must be employed in order to prevent the film from becoming overexposed at closer subject distances. The flash unit 5 attached to the camera 1 provides a simple and efficient means for effectively controlling the amount of light entering lens 2. Flash unit 5 is similar in respects to that described in U.S. Pat. No. 3,943,532 (J. DeFilippis-5) which is incorporated herein by way of reference. Flash body 8 contains the necessary batteries and electronic circuitry to fire the flash lamp 6 when the camera shutter mechanism is actuated. Flash unit 5 contains an electric contact member 16 which becomes operably inserted within the camera flash receptacle when the flash unit 5 is mounted on the camera 1. When the camera shutter mechanism is actuated an electrical signal is supplied to flash unit 5 to cause the lamp 6 to flash and to expose the camera film. The reflector 7 allows the light to be efficiently reflected in a direction forward of the lens 2 so that light reflected back from a subject being photographed enters through the lens 2 to expose the film.

When electronic type flash units are employed with cameras of the type shown in FIG. 1 the level of light intensity reaching the film through lens 2 depends to a great extent upon the distance between the subject and the lens 2. The reflected intensity from a subject 4 to 6 feet in front of lens 2 is greater than, for example, the light reflected from a subject 6 to 8 feet in front of lens 2. Since the camera electronic shutter control mechanism is nonfunctional for the reasons described earlier, the film, therefore, would see a greater amount of light when the subject is within 4 to 6 feet and hence become overexposed. With the camera shown in FIG. 1 the intensity of light emitted by flash unit 5 is sufficient to properly expose the film when the subject stands 6 to 8 feet forward of the camera lens 2. In order to make the flash unit 5 operational with subjects standing within a full range of 4 to 8 feet forward of the camera lens 2 a slidably mounted filter 9 is employed. The filter 9 contains an actuator arm 10 slidably mounted within a slot 11. When the actuator arm 10 is to the extreme right of slot 11 the filter 9 does not become interposed between the subject and the flash lamp 6. This condition is used when the subject is within an approximate distance of 6 to 8 feet forward of the camera lens 2. When the subject is within 4 to 6 feet forward of the camera lens 2, then the filter 9 is operably positioned between the flash lamp 6 and the subject by sliding the actuator arm 10 to the extreme left in slot 11.

Figure 2:
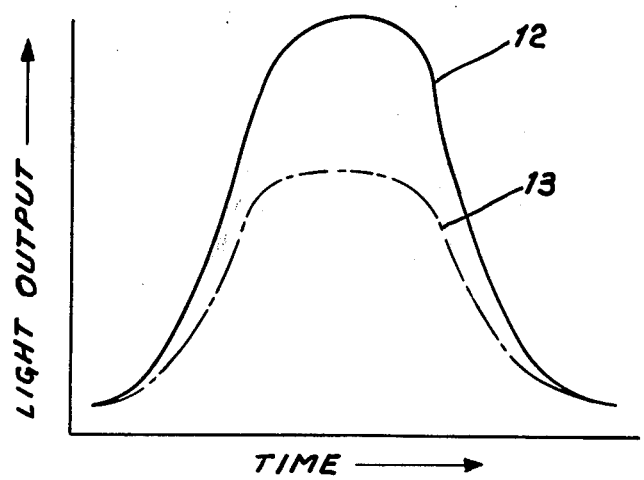
FIG. 2 is a graphic representation of the light intensity generated by the flash unit of FIG. 1.

FIG. 2 shows the light output characteristic as a function of time for the flash unit 5 when the filter 9 is in the two modes of operation. The light intensity profile 12 is an approximation of the amount of light generated by the flash lamp 6 when a subject is within 6 to 8 feet forward of the lens 2 and the filter 9 is not interposed between the flash lamp 6 and the aforementioned subject. The light intensity 12 is sufficient, therefore, to illuminate a subject standing 6 to 8 feet forward of lens 2 without film overexposure. The light intensity profile 13 is the light emitted when a subject is 4 to 6 feet forward of the lens 2 when the filter 9 is interposed between flash lamp 6 and the subject. The filter 9, therefore, limits the amount of light output upon a subject standing 4 to 6 feet forward of lens 2 so that the camera film does not become overexposed.

Figure 3A:
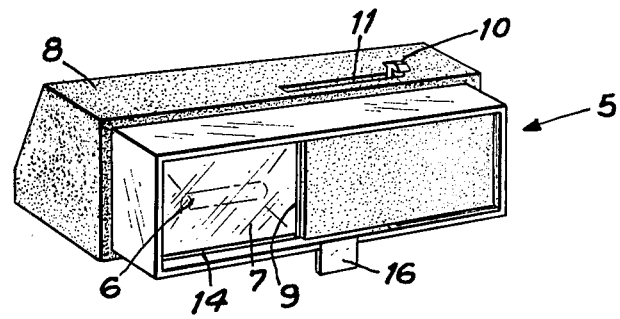
FIG. 3A is a perspective view of the flash unit of this invention with the filter in one condition of operation.
Figure 3B:
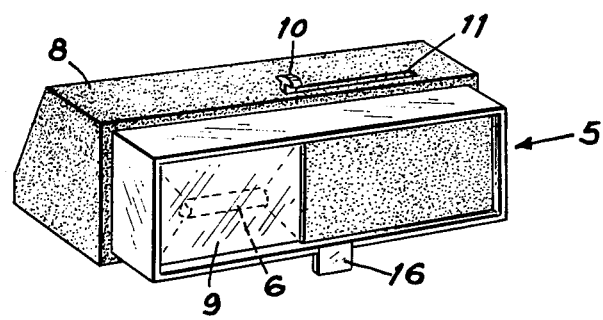
FIG. 3B is a perspective view of the flash unit of FIG. 3A with the filter in a second condition of operation.

FIG. 3A shows the inventive flash unit 5 with the actuator arm 10 to the right of slot 11 and the filter 9 away from flash lamp 6. FIG. 3B shows the flash unit 5 with the actuator arm 10 to the left of slot 11 so that filter 9 is now forward of flash lamp 6. The actuator arm 10 is connected to the filter 9 so that by merely moving the actuator arm 10 in either direction within slot 11 the filter 9 allows the flash unit 5 to operate under both aforementioned conditions.

Figure 4:
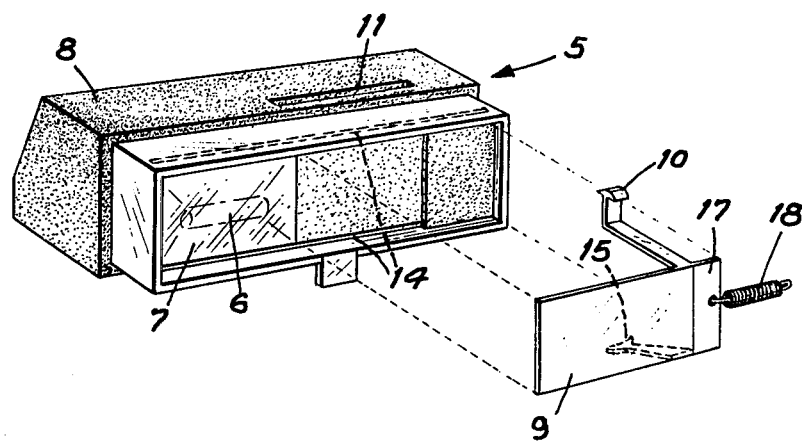
FIG. 4 is a perspective view of the flash unit of this invention with the filter mechanism shown in an exploded view.

FIG. 4 shows one means of mounting the filter 9 within the flash unit 5. A pair of guide tracks 14 on the top and bottom surfaces in the flash unit 5 allows the filter 9 to become slidingly engaged. The actuator arm 10 fixedly coupled to plate 17 which in turn is fixedly attached to filter 9 provides a simple means for moving filter 9 within the guide tracks 14. In order that the filter 9 can remain forward of flash lamp 6 once the operator has moved actuator 10, a detent member 15 operatively engages a part of guide track 14 to hold the filter 9 against the action of return spring 18. A slight amount of pressure on actuator arm 10 in a direction to the right of slot 11 causes the retention of detent member 15 to be overcome by the tension of return spring 18 so that filter 9 slides back along guide tracks 14.

Filter 9 is a neutral density type filter so that the amount of illumination from flash lamp 6 can be predeterminantly reduced without changing the light color. Other types of materials can be used to manufacture the filter 9 when, for example, variations in color are desired. Filter 9 can be made of a light transmissive plastic material and actuator arm 10, and detent member 15 can also be plastic. Plate 17 can be of a plastic or metal depending upon whether the actuator arm 10 and detent member 15 are to be integrally molded with plate 17 for economic manufacturing purposes.

Although the multiple light intensity flash unit of this invention finds immediate application for flash photography applications this is not intended as a limitation in the scope of this invention. The multiple light intensity flash unit of this invention finds application wherever multiple light levels may be required.

What is claimed is:

1. A multiple light intensity flash unit for a camera comprising:
    a housing;
    a flash lamp mounted in said housing;
    a light altering member slidably coupled in said housing;
    an actuator arm coupled to said light altering member, said actuator arm accessible from without said housing;
    a detent member coupled to said light altering member for retaining said light altering member in a first position in front of said flash lamp; and
    a spring coupled to said light altering member and to said housing for returning said member to a rest position away from said lamp.

2. The flash unit of claim 1 wherein the light altering member comprises a filter.

3. The flash unit of claim 2 wherein the filter comprises a neutral density type filter.

4. The flash unit of claim 2 wherein the filter is mounted within the housing by means of a pair of guide track members.

5. A multiple light intensity flash unit for a camera comprising:
    a housing;
    a flash lamp mounted in said housing;
    a light filter slidably coupled in said housing;
    an actuator arm coupled to said light filter, said actuator arm accessible from without said housing;
    a detent member coupled to said light filter for retaining said light filter in a first position in front of said flash lamp;
    a spring coupled to said light filter and to said housing for returning said member to a rest position away from said lamp;
    connector means depending from said flash unit for mechanically and electrically connecting the flash unit to the camera; and
    circuit means within the flash unit for igniting said flash lamp in response to operation of the camera.

6. The flash unit of claim 5 wherein the filter comprises a neutral density filter for decreasing light intensity from said lamp when the filter is in the first condition of operation and for allowing full illumination from said lamp when the filter is in the second condition of operation.

7. The flash unit of claim 6 wherein the neutral density filter is slidably mounted within a pair of guide tracks and is retained in the first condition of operation by a detent member and is returned to the second condition of operation by means of a spring.

* * * * *